May 13, 1958 R. C. GADDIS 2,834,487
FOLDING ELEVATOR FOR VEHICLES
Filed July 11, 1955 3 Sheets-Sheet 1
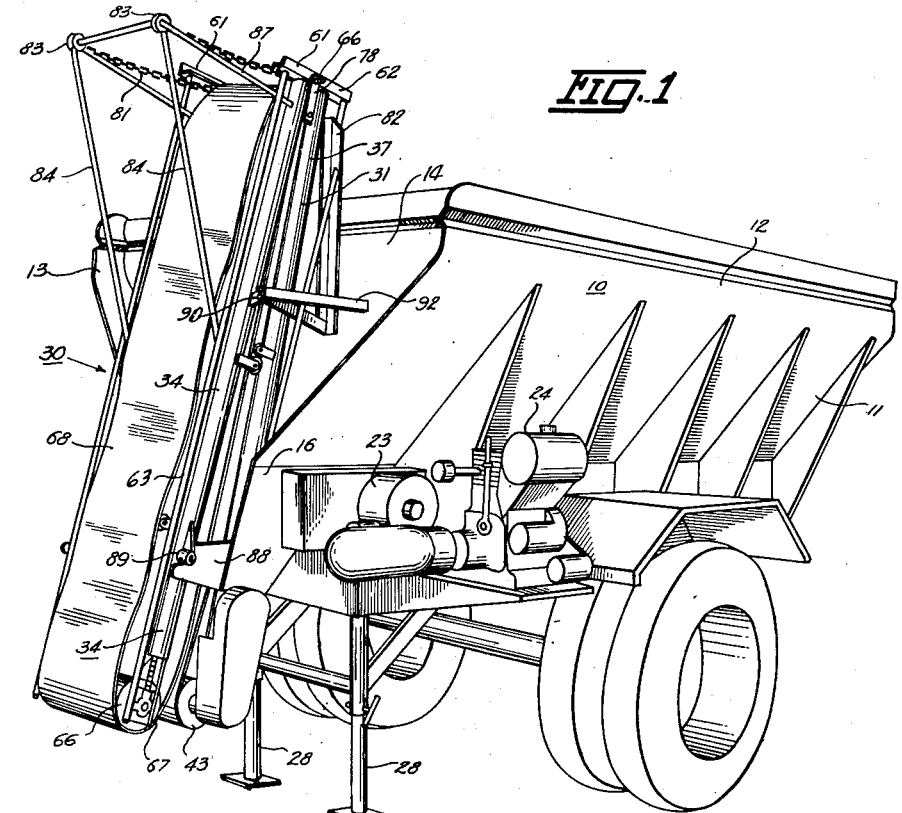
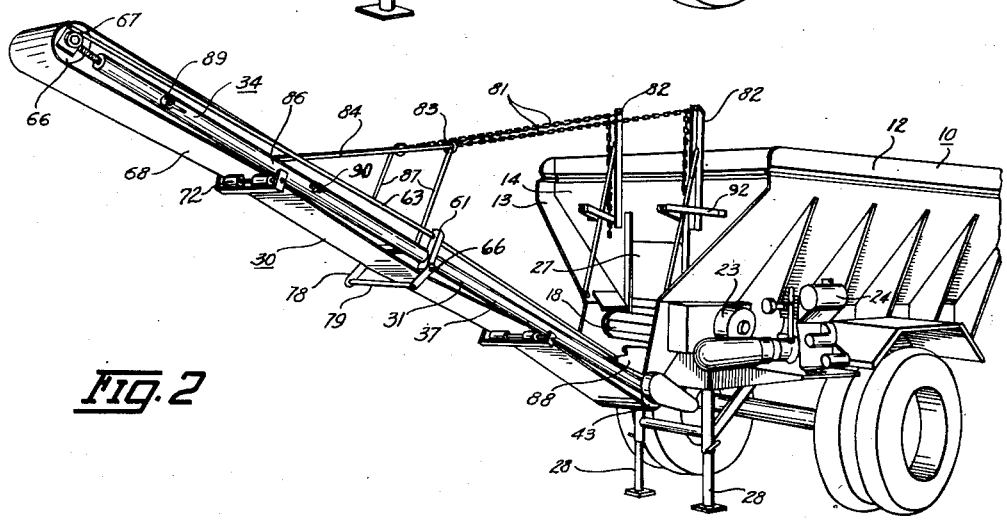
INVENTOR.
ROY C. GADDIS
BY
*R. Donald Pitts*
AGENT

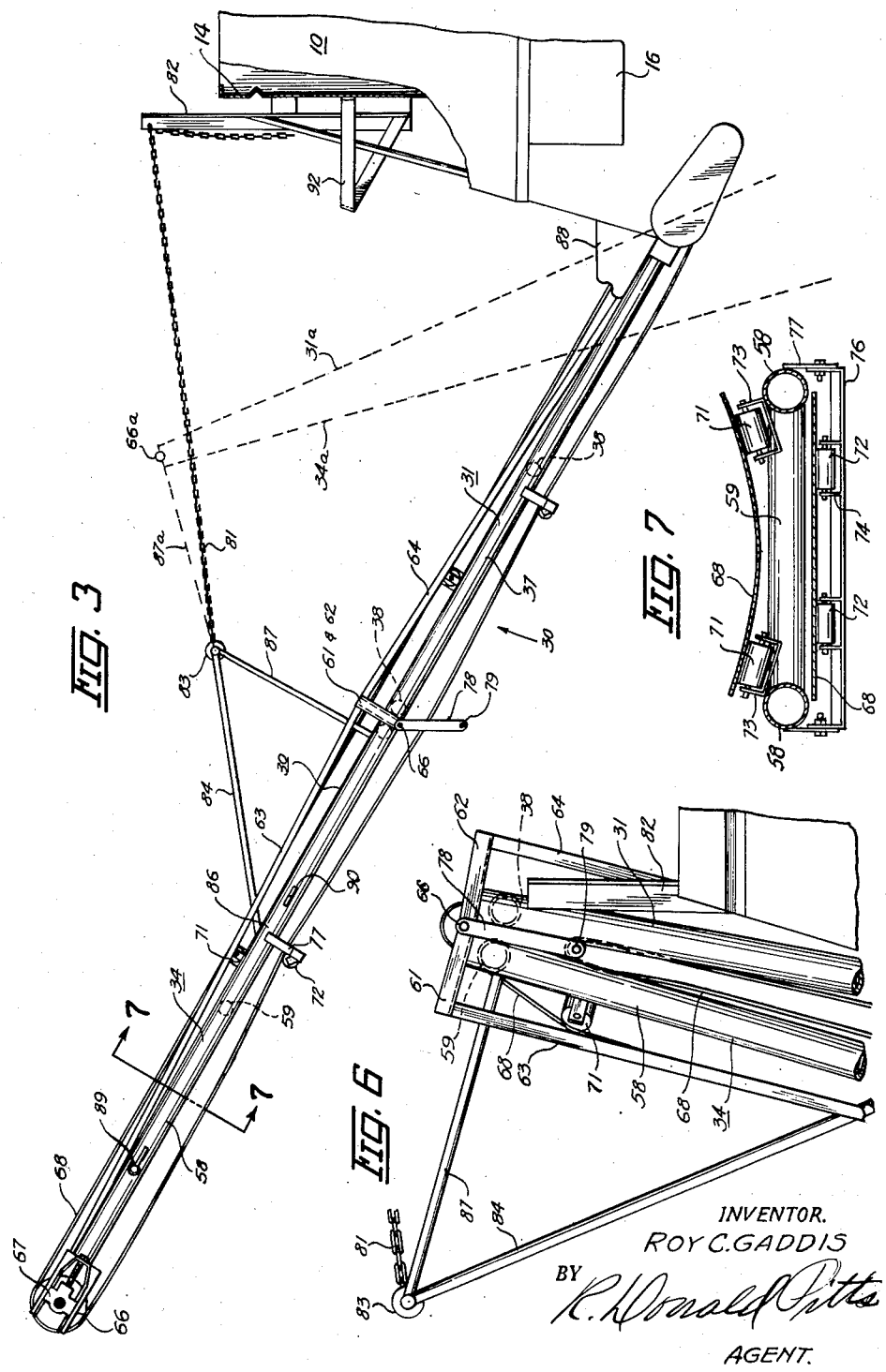

May 13, 1958 R. C. GADDIS 2,834,487
FOLDING ELEVATOR FOR VEHICLES
Filed July 11, 1955 3 Sheets-Sheet 3
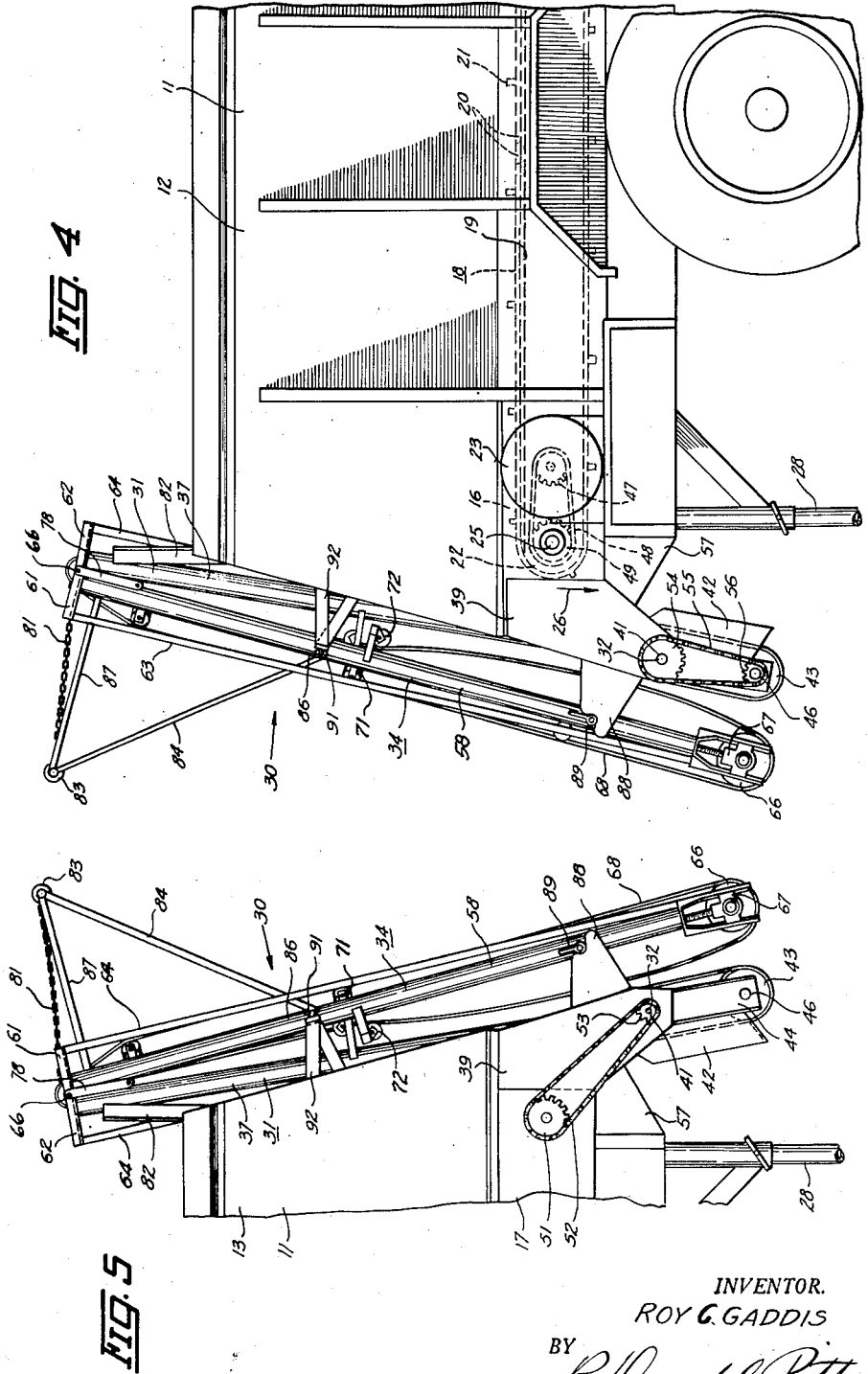
INVENTOR.
ROY C. GADDIS
BY
R. Donald Pitts
AGENT.

United States Patent Office 2,834,487
Patented May 13, 1958

2,834,487

FOLDING ELEVATOR FOR VEHICLES

Roy C Gaddis, Cedar Rapids, Iowa

Application July 11, 1955, Serial No. 520,947

4 Claims. (Cl. 214—83.26)

This invention relates to material handling devices and particularly to unloading mechanisms for bulk material transport vehicles.

It is becoming more and more common practice to handle and transport many kinds of materials and commodities in their bulk form. In the handling of such bulk material in hopper-type vehicles, or trailers or the like, provisions may be made for unloading the vehicles mechanically. It is frequently necessary, also, when unloading such vehicles, to elevate material to a higher level, normally requiring auxiliary equipment.

Also, in the hauling of bulk material, it is frequently desirable to increase the payload even though practical considerations prevent the use of larger vehicles or vehicle hopper bodies. As an example, agricultural lime is frequently distributed from a hopper-type vehicle having rotary-disc spreaders at the rear of the body fed by an apron feeder. Because of the fact that such vehicles must operate over rough, plowed ground, it is considered impractical to build as great a load capacity into such vehicles as would otherwise be done. Therefore, one of the best ways of increasing the payload of such a device, is to employ a trailer. In order for this to be practical, however, the trailer must be equipped to discharge its load into the body of the spreader device.

This invention, then, relates primarily to means for transferring the load from such a trailer to the hopper of the spreader vehicle or for elevating material discharged from any vehicle.

It is a primary object of my invention to provide new, novel and improved means for handling bulk materials.

It is another primary object of my invention to provide a self-contained, mobile unit adapted to unload itself and elevate material, during unloading, to a higher level.

A more specific object of the invention is the provision of an improved elevator structure which may be folded and supported entirely by the rear end of the vehicle on which it is mounted and which may be quickly and easily arranged for transport or for unloading by one operator.

A further object of the invention is the provision of an improved belt conveyor structure embodying new and novel supporting means.

Other and further features and objects of the invention will be more apparent to those skilled in the art upon a consideration of the accompanying drawings and the following specification, wherein is disclosed a single exemplary embodiment of the invention, with the understanding, however, that such changes may be made therein as fall within the scope of the appended claims, without departing from the spirit of the invention.

In the drawings:

Figure 1 is a view in rear perspective of a hopper-type vehicle embodying a self-unloading mechanism for bulk materials along with an elevating conveyor constructed in accordance with a preferred embodiment of my invention. The conveyor is illustrated in its collapsed position for transport.

Figure 2 is a view in rear perspective of the same device but showing the elevating conveyor in its extended position ready for operation.

Figure 3 is a partial view in side elevation, illustrating, in particular, the general structure of the elevating conveyor.

Figure 4 is a view in right side elevation of the same device as shown in Figure 1. The engine has been omitted from this view so as to better show the structure.

Figure 5 is a similar partial view in elevation of the device of Figure 1 but as viewed from the opposite or left side.

Figure 6 is an enlarged, fragmentary view of the hinged or middle portion of the conveyor, and Figure 7 is a view in transverse section of the outer boom of the conveyor as taken along the line 7—7 of Figure 3.

Referring now to these drawings and, in particular, to Figures 1 and 2 thereof, I have shown, as best to exemplify my invention, a hopper type trailer which I have indicated generally at 10. The hopper structure 11 includes downwardly converging side wall panels 12 and 13 joined by the rear-end panel 14 and front-end panel 15, not shown. The hopper side walls terminate at their lower edges in transversely-spaced, vertical portions 16 and 17 to provide an elongated enclosure for an apron feeder. This feeder or conveyor 18 is of more or less standard construction as taught by Patent No. 2,493,451.

Although the details of this portion of the device form no part of the present invention, the conveyor 18 comprises, in general, an apron or bed plate 19 (see Figure 4) joining and forming a bottom for the side wall panels. A pair of chains 20—20, tied together by transverse drag links 21 are driven by sprockets, indicated at 22, on the feeder drive shaft 25. These are driven by the gear speed reduction unit 23. This speed reduction unit is driven by any conventional means, but in this case by the gasoline engine 24. The drag links attached to the chains above the bed plate 19 engage material in the bottom of the hopper and drag it to the rear of the hopper discharging it in a sheet from the rear of the bed plate as indicated by the arrow at 26 in Figure 4. Means, such as the slidable gate at 27, are provided to control the rate of flow of material discharged by the feeder.

Since the vehicle shown is a trailer, adjustable legs 28 are provided at the rear end thereof to support the trailer when detached from its prime mover.

The elevating conveyor 30, is arranged to receive material discharged from the hopper by the apron feeder 18 and elevate it to a higher level, as for example, into the hopper of another vehicle. This elevator which is shown in operating position in Figures 2 and 3, is adapted to be collapsed or folded into transport position against the rear of the vehicle as shown in Figure 1.

The elevating conveyor 30 comprises, a lower boom 31 pivotally attached, as at 32, to the rear end of the vehicle frame, and an upper boom 34 pivotally attached to the outer end of the lower boom as at 66. The lower boom includes laterally spaced, longitudinal frame members 37 with transverse frame members 38 affixed therebetween to form a rigid rectangular frame. This is pivotally attached as at 32 to the depending frame member 39 at the rear of the hopper. This pivot point is coaxial with a jack shaft 41 which will be explained hereinafter.

A portion of the lower boom frame extends downwardly beyond the pivotal point 32, as best shown in Figures 4 and 5, a shallow fence 42 being affixed thereto. The belt driving drum 43 is mounted between the lower or inner ends of the lower boom frame extensions 44 on a drum shaft 46. Power to rotate this shaft and the driving drum 43 is supplied by the gas engine and the gear speed reducer 23 through the agency of a sprocket and chain drive 47, 48 and 49 (Figure 4), the feeder drive shaft 25, a sprocket and chain drive 51, 52 and 53 (Figure 5) to drive the jack shaft 41. Power is transferred from this jack shaft to the belt driving drum 43 by means of the sprocket and chain drive 54, 55 and 56 (Figure 4).

It may be understood now that, when the conveyor is extended outwardly into operating position as in Figure 2 or 3, the lower end of the lower boom moves inwardly causing the fence 42 to contact the underside of the aprons or panels 57 to thereby form an enclosure to serve as an inlet hopper for the elevating conveyor 30. This inlet hopper is, of course, fed by the apron feeder 18 from the main hopper.

The upper boom 34 also has a rigid rectangular frame fabricated from longitudinal members 58 and transverse members 59. The adjoining ends of the upper and lower booms are provided with angle members 61 and 62 respectively which secure the ends of the truss rods 63 and 64 as well as serve as hinge straps. A hinge pin 66, passing through apertures in the lower ends of these hinge straps serves to pivotally secure the upper boom to the lower boom. The upper or outer end of the upper boom is provided with an idler drum 66 which is mounted for free rotation in adjustable bearings 67.

The endless conveyor belt 68 extends from end to end of the conveyor, when extended, passing over the idler drum 66 at the upper, outer end and being driven by the driving drum 43. Portions of the belt, intermediate to the driving and idler drums, are supported by a plurality of idler rollers 71 and 72. The rollers 71 which support the upper or load bearing portion of the belt are preferably mounted in brackets 73 which are welded or otherwise secured to the longitudinal frame members 58 at an angle, as shown in Figure 7. The rollers 72, which support the return portion of the belt, are supported between brackets 74 which are secured in turn to an angle crosspiece 76 adjustably secured to the slotted brackets 77.

The boom hinge pin 66 carries a pair of depending straps 78 which, in turn, carry a transverse rod 79 adapted to support the lower or return portion of the belt when the conveyor is collapsed.

The rigging for supporting the elevator 30 is best shown in Figures 2 and 3. It preferably includes flexible supporting means such as supporting chains 81, each adjustably affixed, at one end, to posts 82 which extend upwardly from the rear of the vehicle box. The other ends of the chains are attached, by means of collars 83, to the tie rods 84 which members are preferably rigid and in line with the chains. These tie rods 84 are affixed to the outer boom at a point intermediate its ends, as at 86, whereby the weight of the portions of the entire conveyor below the point of attachment 86 overbalances the extended portion of the outer boom to thereby prevent the conveyor from collapsing.

The tie rods 84 are spaced and braced outwardly from the outer boom by means of rigid struts 87 which extend generally at right angles to the outer boom.

The elevator is supported in its folded position by brackets 88 extending rearwardly from the vehicle frame. Pins 89 extending laterally from the outer boom frame are adapted to engage with these brackets, when the conveyor is folded, so as to support a portion of its weight. The conveyor is secured against dislodgement from the brackets 88 during transport, by means of bolting lugs or ears affixed to the sides of the outer boom frame, as indicated at 90. These bolting lugs are arranged to be secured by the bolts 91 between the transport brackets 92 affixed to and extending rearwardly from the vehicle hopper on both sides of the folded inner and outer booms.

The elevator 30 is adapted, by its construction, to permit its erection and dismantling in just a few minutes by one man alone. Setting up for use is accomplished as follows: the bolts 91, which secure the inner boom to the brackets 92, are removed. The free end of the outer boom is pulled outwardly to disengage it from the supporting brackets 88. Both booms may now be pulled slowly outwardly at the top until they reach the position indicated by broken lines 31a and 34a in Figure 3. At this point, the chain 81 comes into effect to support the booms. The outer or free end of the outer boom may now be swung outwardly and upwardly with the chains 81 and the struts 87 supporting the load. The struts serve as bell cranks whereby the weight of the inner boom as well as a portion of the outer boom is utilized to aid in lifting the outer end of the outer boom to its normal operating position.

Dismantling is, of course, accomplished in the reverse order by first pushing up at the hinged junction of the inner and outer booms or pulling downwardly on the outer end of the outer boom.

Although I have shown and described a specific embodiment of my invention, it is apparent that modifications thereof may be made by those skilled in the art. For example, such an elevating conveyor could be mounted as an integral part of a truck rather than mounted on a trailer as illustrated. Such modifications may be made without departing from the spirit and scope of the invention as set forth in the appended claims.

I claim as my invention:

1. In a vehicle having a hopper and a generally horizontal conveyor for unloading the hopper; an elevating conveyor comprising, a lower boom, means pivotally mounting the lower boom adjacent the discharge end of the horizontal conveyor, an upper boom pivotally attached at the outer end of the lower boom, hinge stop means adapted to prevent downward hinging at the point of attachment of the outer boom to the inner boom, a driving drum mounted co-axial with the pivotal mounting means, an idler drum mounted for free rotation in the outer end of the outer boom, a belt extending over the said drums, and a rigging for supporting the elevating conveyor when extended, the said rigging including, rigid struts extending upwardly from the inner end of the outer boom, flexible supporting means extending between the rigid struts and the adjacent end of the vehicle hopper at a point above the pivot mounting means and tie members extending between the upper ends of the struts and an intermediate portion of the outer boom generally in line with the said flexible supporting means.

2. In a material handling device, a mobile supporting structure, a portable, foldable, elevating conveyor comprising a lower boom, means for pivotally supporting the lower end of the lower boom in the lower portion of the supporting structure, an upper boom pivotally connected to the outer end of the lower boom, means preventing hinging of the outer boom upwardly relative to the lower boom, a driving drum mounted co-axial with the said pivotal supporting means, an idler drum mounted at the outer end of the upper boom, a belt extending over said drums, and a rigging for supporting the elevating conveyor when extended, the said rigging including, rigid struts extending from the inner end of the outer boom, upwardly, generally at right angles to the upper boom, flexible supporting means extending between the rigid struts and the supporting structure at a point above and spaced from the pivotal supporting means and tie members extending between the upper ends of the struts and an intermediate portion of the outer boom.

3. In a material handling device, a mobile supporting structure, a portable, foldable elevator comprising a lower boom, means pivotally supporting the lower boom in the lower portion of the supporting structure for selective positioning in an outwardly extending, conveying position or in an upwardly extending transport position lying generally against the end of the supporting structure, an outer boom pivotally attached at its inner end to the outer end of the lower boom, a driving drum mounted co-axial with the pivotal supporting means, an idler drum mounted in the outer end of the outer boom, a belt extending over said drums, brackets extending outwardly from the supporting structure alongside the lower and outer booms, means on the outer boom adapted to engage and be supported by the brackets when said lower and outer booms are in said transport position and means adapted to secure the outer boom in such supported position.

4. In a material handling device, a mobile supporting structure, a portable, foldable elevator including inner and outer booms, means for pivotally supporting the inner boom at its lower end in the lower portion of the supporting structure, means for hingedly connecting the inner end of the outer boom to the outer end of the inner boom, brackets for supporting and securing the elevator in folded position against the adjacent portion of the supporting structure, and rigging for supporting the elevator in extended position, said rigging including struts extending outwardly and generally upwardly from the inner end of the outer boom, supporting means extending between the right struts and the supporting structure at a point spaced upwardly from the pivotal supporting means and tie members extending between the upper ends of the struts and an intermediate portion of the outer boom.

References Cited in the file of this patent
UNITED STATES PATENTS

| | | |
|---|---|---|
| 1,639,808 | Oppenheim et al. | Aug. 23, 1927 |
| 2,275,799 | Oklejas | Mar. 10, 1942 |
| 2,347,522 | Stinnett | Apr. 25, 1944 |
| 2,411,056 | Ricketts | Nov. 12, 1946 |
| 2,590,965 | Huston | Apr. 1, 1952 |
| 2,636,628 | Prang | Apr. 28, 1953 |
| 2,656,034 | Filsinger et al. | Oct. 20, 1953 |
| 2,699,877 | Huston | Jan. 18, 1955 |